United States Patent
Mellet et al.

(10) Patent No.: US 9,568,068 B2
(45) Date of Patent: Feb. 14, 2017

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US); Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 273 days.

(21) Appl. No.: 13/849,601

(22) Filed: Mar. 25, 2013

(65) Prior Publication Data

US 2013/0267371 A1 Oct. 10, 2013

Related U.S. Application Data

(60) Provisional application No. 61/619,985, filed on Apr. 4, 2012.

(51) Int. Cl.
| | |
|---|---|
| *F16H 3/62* | (2006.01) |
| *F16H 3/44* | (2006.01) |
| *F16H 3/68* | (2006.01) |
| *F16H 3/66* | (2006.01) |

(52) U.S. Cl.
CPC ........ *F16H 3/62* (2013.01); *F16H 3/66* (2013.01); *F16H 2200/0078* (2013.01); *F16H 2200/2012* (2013.01); *F16H 2200/2048* (2013.01)

(58) Field of Classification Search
CPC ............... F16H 2200/2012; F16H 2200/2048
See application file for complete search history.

(56) References Cited

U.S. PATENT DOCUMENTS

| | | | | |
|---|---|---|---|---|
| 5,478,291 | A * | 12/1995 | Morisawa et al. | 475/148 |
| 7,128,683 | B2 * | 10/2006 | Oguri et al. | 475/276 |
| 2010/0331138 | A1 * | 12/2010 | Phillips | 475/278 |
| 2012/0172173 | A1 * | 7/2012 | Wittkopp et al. | 475/277 |
| 2013/0137544 | A1 * | 5/2013 | Mellet et al. | 475/276 |
| 2013/0143709 | A1 * | 6/2013 | Kempf et al. | 475/275 |
| 2014/0248989 | A1 * | 9/2014 | Hart et al. | 475/276 |

FOREIGN PATENT DOCUMENTS

CN          1592824 A          3/2005

* cited by examiner

*Primary Examiner* — Tisha Lewis

(57) ABSTRACT

A transmission has an input member, an output member, at least four planetary gear sets, a plurality of coupling members and a plurality of torque transmitting devices. Each of the planetary gear sets includes first, second and third members. The torque transmitting devices include clutches and brakes actuatable in combinations of three to establish a plurality of forward gear ratios and at least one reverse gear ratio.

18 Claims, 5 Drawing Sheets

| GEAR STATE | GEAR RATIO | RATIO STEP | TORQUE TRANSMITTING ELEMENTS ||||||| 
|---|---|---|---|---|---|---|---|---|---|
| | | | 36 | 34 | 32 | 26 | 24 | 28 | 30 |
| REV1 | -4.563 | | | X | X | | | X | |
| REV2 | -6.015 | | X | X | X | | | | |
| N | | | | | | | | | |
| 1ST | 4.935 | 1.43 | | | X | X | | X | |
| 2ND | 3.445 | 1.53 | X | | X | X | | | |
| 3RD | 2.257 | 1.37 | X | | | X | | X | |
| 4TH | 1.886 | 1.20 | X | X | | X | | | |
| 5TH | 1.422 | 1.33 | | X | | X | | X | |
| 6TH | 1.255 | 1.13 | X | | | X | X | | |
| 7TH | 1.000 | 1.25 | | | | X | X | X | |
| 8TH | 0.893 | 1.12 | | X | | X | X | | |
| 9TH | 0.800 | 1.12 | | X | | | X | X | |
| 10TH | 0.767 | 1.04 | X | X | | X | | | |
| 11TH | 0.681 | 1.13 | X | | | | X | X | |
| 12TH | 0.598 | 1.14 | | | | | X | X | X |
| 13TH | 0.568 | 1.05 | X | | | | X | | X |

X = ON - ENGAGED CARRYING TORQUE

FIG. 3

US 9,568,068 B2

MULTI-SPEED TRANSMISSION

CROSS-REFERENCE TO RELATED APPLICATION

This application claims the benefit of U.S. Provisional Application No. 61/619,985 filed Apr. 4, 2012. The disclosure of the above application is incorporated herein by reference.

FIELD

The invention relates generally to a multiple speed transmission, and more particularly, to a transmission having a plurality speeds, planetary gear sets and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

In an aspect of the present invention, the first, second, third and fourth planetary gear sets each have a sun gear, a carrier member and a ring gear.

In another aspect of the present invention, the input member is continuously connected for common rotation with the sun gear of the first planetary gear set.

In still another aspect of the present invention, the output member is continuously connected for common rotation with the ring gear of the fourth planetary gear set.

In still another aspect of the present invention, a first interconnecting member continuously interconnects the carrier member of the first planetary gear set with the ring gear of the third planetary gear set.

In still another aspect of the present invention, a second interconnecting member continuously interconnects the ring gear of the first planetary gear set with the carrier member of the second planetary gear set.

In still another aspect of the present invention, a third interconnecting member continuously interconnects the ring gear of the second planetary gear set with the carrier member of the third planetary gear set and the sun gear of the fourth planetary gear set.

In still another aspect of the present invention, a first torque transmitting mechanism is selectively engageable to interconnect the sun gear of the first planetary gear set and the input member with the carrier member of the fourth planetary gear set.

In still another aspect of the present invention, a second torque transmitting mechanism is selectively engageable to interconnect the carrier member of the first planetary gear set and the ring gear of the third planetary gear set with the carrier member of the fourth planetary gear set.

In still another aspect of the present invention, a third torque transmitting mechanism is selectively engageable to interconnect the ring gear of the first planetary gear set and the carrier member of the second planetary gear set with the sun gear of the second planetary gear set.

In yet another aspect of the present invention, a fourth torque transmitting mechanism is selectively engageable to interconnect the carrier member of the first planetary gear set and ring gear of the third planetary gear set with a stationary member.

In yet another aspect of the present invention, a fifth torque transmitting mechanism is selectively engageable to interconnect the carrier member of the fourth planetary gear set with the stationary member.

In yet another aspect of the present invention, a sixth torque transmitting mechanism is selectively engageable to interconnect the sun gear of the third planetary gear set with the stationary member.

In yet another aspect of the present invention, a seventh torque transmitting mechanism is selectively engageable to interconnect the sun member of the second planetary gear set with the stationary member.

In yet another aspect of the present invention, the torque transmitting mechanisms are selectively engageable in combinations of at least three to establish a plurality of forward speed ratios and at least one reverse speed ratio between the input member and the output member In still another aspect of the present invention, the clutches and brakes can be of any type including but not limited to a fiction clutch, a friction band, a one way clutch, a selectable one way clutch, a dog clutch, a synchronizer and similar devices. Furthermore, any node can use a single device or a combination of these devices e.g. the first brake may be configured as a dog clutch and a one way clutch combination or a one way clutch and friction clutch combination. Similarly, several other combinations are possible.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 1:
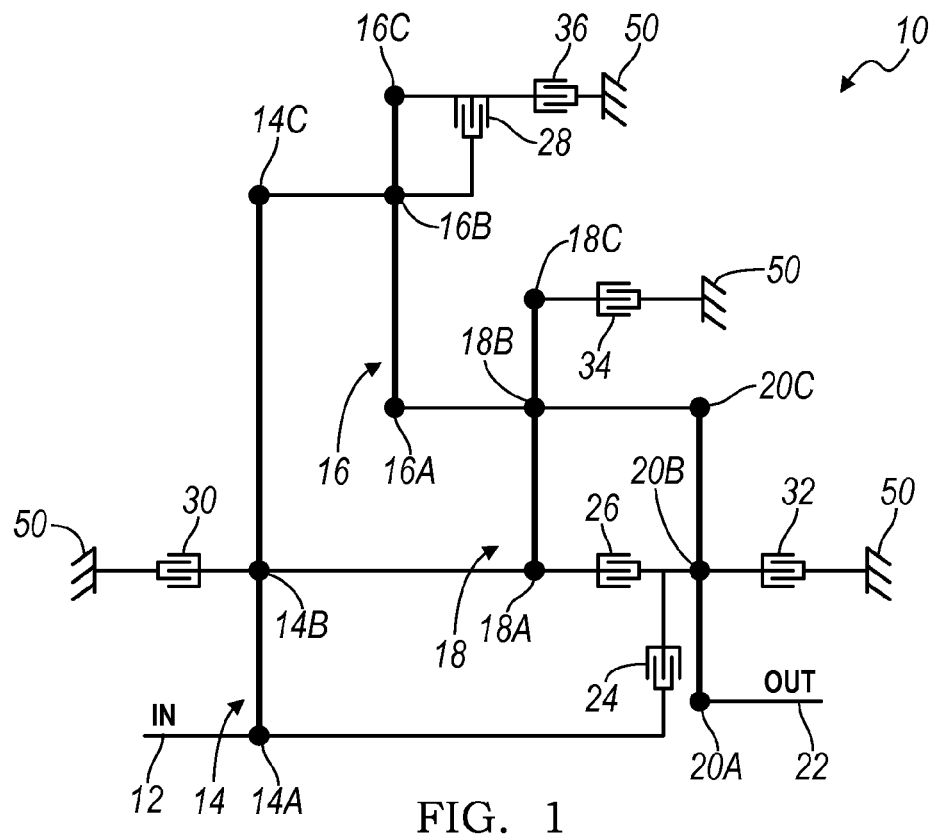
FIG. 1 is a lever diagram of an embodiment of a transmission according to the principles of present invention.
Figure 2:
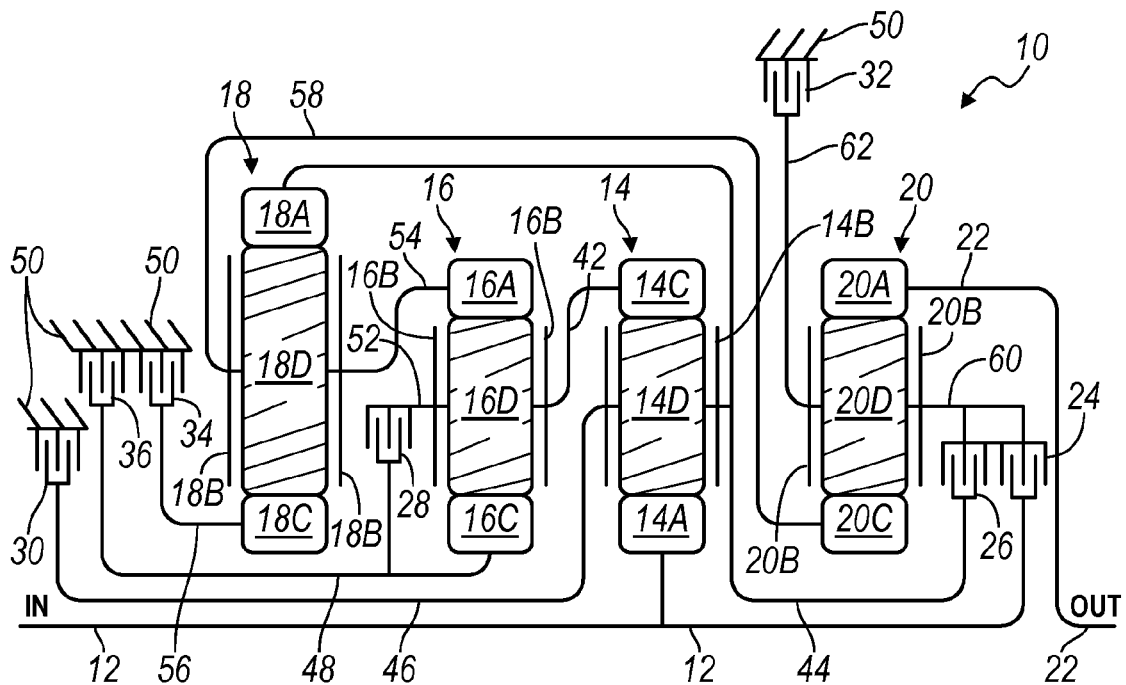
FIG. 2 is a diagrammatic illustration of a variation of the transmission of FIG. 1 according to the principles of the present invention.

FIG. 3 is a truth table presenting an example of a state of engagement of various torque transmitting elements to produce thirteen forward and at least one reverse speed or gear ratios of the transmissions illustrated in FIGS. 1-2; and FIGS. 4A, 4B, 5A, 5B, 6A and 6B are diagrammatic illustrations of various interconnections of the third clutch 28 according to the principles of the present invention.

DETAILED DESCRIPTION

The following description is merely exemplary in nature and is not intended to limit the present disclosure, application, or uses.

At the outset, it should be appreciated that the embodiments of the thirteen speed automatic transmission of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a second component or element of a first planetary gear set is permanently coupled to a first component or element of a third planetary gear set. A third component or element of the first planetary gear set is permanently coupled to a second component or element of a second planetary gear set. A first component or element of the second planetary gear set is permanently coupled to a second component or element of a third planetary gear set and to a third component or element of a fourth planetary gear set.

Referring now to FIG. 1, an embodiment of a thirteen speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 14A of the first planetary gear set 14. The output member 22 is continuously coupled to the first node 20A of the fourth planetary gear set 20.

The second node 14B of the first planetary gear set 14 is coupled to the first node 18A of the third planetary gear set 18. The third node 14C of the first planetary gear set 14 is coupled to the second node 16B of the second planetary gear set 16. The first node 16A of the second planetary gear set 16 is coupled to the third node 18B of the third planetary gear set 18 and to the third node 20C of the fourth planetary gear set 20.

A first clutch 24 selectively connects the first node 14A of the first planetary gear set 14 with the second node 20B of the fourth planetary gear set 20. A second clutch 26 selectively connects the second node 14B of the first planetary gear set 14 and the first node 18A of the third planetary gear set 18 with the second node 20B of the fourth planetary gear set 20. A third clutch 28 selectively connects the third node 14C of the first planetary gear set 14 and the second node 16B of the second planetary gear set 16 with the third node 16C of the second planetary gear set 16.

A first brake 30 selectively connects the second node 14B of the first planetary gear set 14 and the first node 18A of the third planetary gear set 18 with a stationary member or transmission housing 50. A second brake 32 selectively connects the second node 20B of the fourth planetary gear set 20 with the stationary member or transmission housing 50. A third brake 34 selectively connects the third node 18C of the third planetary gear set 18 with the stationary member or transmission housing 50. A fourth brake 36 selectively connects the third node 16C of the second planetary gear set 16 with the stationary member or transmission housing 50.

Referring now to FIG. 2, a stick diagram presents a schematic layout of an embodiment of the thirteen speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14B, and a planet gear carrier member 14C that rotatably supports a set of planet gears 14D (only one of which is shown) The sun gear member 14A is connected for common rotation with the input shaft or member 12. The ring gear member 14C is connected for common rotation with a first shaft or interconnecting member 42. The planet carrier member 14B is connected for common rotation with a second shaft or interconnecting member 44 and a third shaft or interconnecting member 46. The set of planet gears 14D are each configured to intermesh with both the sun gear member 14A and the ring gear member 14C.

The second planetary gear set 16 includes a sun gear member 16C, a ring gear member 16A, and a planet gear carrier member 16B that rotatably supports a set of planetary gears 16D (only one of each is shown). The sun gear member 16C is connected for common rotation with the fourth shaft or interconnecting member 48. The planet carrier member 16B is connected for common rotation with the first shaft or interconnecting member 42 and the fifth shaft or interconnecting member 52. The ring gear member 16A is connected for common rotation with a sixth shaft or interconnecting member 54. The planet gears 16D are each configured to intermesh with both the ring gear member 16A and the sun gear member 16C.

The third planetary gear set 18 includes a sun gear member 18C, a ring gear member 18A, and a planet gear carrier member 18B that rotatably supports a set of planet gears 18D (only one of which is shown). The sun gear member 18C is connected for common rotation with a seventh shaft or interconnecting member 56. The planet carrier member 18B is connected for common rotation with the sixth shaft or interconnecting member 54 and an eighth shaft or interconnecting member 58. The ring gear member 18A is connected for common rotation with the second shaft or interconnecting member 44. The planet gears 18D are each configured to intermesh with both the sun gear member 18C and the ring gear member 18A.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with the eighth shaft or interconnecting member 58. The ring gear member 20A is connected for common rotation with the output shaft or member 22. The planetary gear carrier member 20B is connected for common rotation with a ninth shaft or interconnecting member 60 and a tenth shaft or interconnecting member 62. The planet gears 20D are each configured to intermesh with both the sun gear member 20C and the ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, and third clutches 24, 26, 28 and the first, second, third and fourth brakes 30, 32, 34 and 36 allow for selective interconnection of the shafts or interconnecting members 42, 44, 46, 48, 52, 54, 56, 58, 60, 62 of the planetary gear sets 14, 16, 18, 20 and the housing 50.

For example, the first clutch 24 is selectively engageable to connect the input shaft or member 12 with the ninth shaft or interconnecting member 60. The second clutch 26 is selectively engageable to connect the second shaft or interconnecting member 44 with the ninth shaft or interconnecting member 60. The third clutch 28 is selectively engageable to connect the fourth shaft or interconnecting member 48 with the fifth shaft or interconnecting member 52.

The first brake 30 is selectively engageable to connect the third shaft or interconnecting member 46 with the stationary element or the transmission housing 50 in order to restrict the member 46 from rotating relative to the transmission housing 50. The second brake 32 is selectively engageable to connect the tenth shaft or interconnecting member 62 with the stationary element or the transmission housing 50 in order to restrict the member 62 from rotating relative to the transmission housing 50. The third brake 34 is selectively engageable to connect the seventh shaft or interconnecting member 56 with the stationary element or the transmission housing 50 in order to restrict the member 56 from rotating relative to the transmission housing 50. The fourth brake 36 is selectively engageable to connect the fourth shaft or interconnecting member 48 with the stationary element or the transmission housing 50 in order to restrict the member 48 from rotating relative to the transmission housing 50. In turn, the components of the planetary gear sets connected to each of the connecting members are also connected or restricted accordingly.

Referring now to FIG. 2 and FIG. 3, the operation of the thirteen speed transmission 10 embodiment will be described. It will be appreciated that transmission 10 is capable of transmitting torque from the input shaft or member 12 to the output shaft or member 22 in thirteen or more forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, first brake 30, second brake 32, third brake 34 and fourth brake 36), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the third clutch 28, the second brake 32 and the third brake 34 are engaged or activated. The third clutch 28 connects the fourth shaft or interconnecting member 48 with the fifth shaft or interconnecting member 52. The second brake 32 connects the tenth shaft or interconnecting member 62 with the stationary element or the transmission housing 50 in order to restrict the member 62 from rotating relative to the transmission housing 50, which restricts the carrier member 20B from rotating relative to the transmission housing 50. The third brake 34 connects the seventh shaft or interconnecting member 56 with the stationary element or the transmission housing 50 in order to restrict the member 56 from rotating relative to the transmission housing 50, which restricts the sun gear 18C from rotating relative to the transmission housing 50. Likewise, thirteen forward ratios are achieved through different combinations of clutch and brake engagement, as shown in FIG. 3, by way of example.

Further, the present invention contemplates that at least one additional reverse gear (REV2) is achievable by the transmission of FIGS. 1 and 2. As shown in FIG. 3, a second reverse gear ratio is achieved through selective activation or engagement of the second brake 32, the third brake 34 and the fourth brake 36. The second brake 32 connects the tenth shaft or interconnecting member 62 with the stationary element or the transmission housing 50 in order to restrict the member 62 from rotating relative to the transmission housing 50, which restricts the carrier member 20B from rotating relative to the transmission housing 50. The third brake 34 connects the seventh shaft or interconnecting member 56 with the stationary element or the transmission housing 50 in order to restrict the member 56 from rotating relative to the transmission housing 50, which restricts the sun gear 18C from rotating relative to the transmission housing 50. The fourth brake 36 connects the fourth shaft or interconnecting member 48 with the stationary element or the transmission housing 50 in order to restrict the member 48 from rotating relative to the transmission housing 50, which restricts the sun gear 16C from rotating relative to the transmission housing 50.

It will be appreciated that the foregoing explanation of operation and gear states of the thirteen speed embodiment of transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 4A:
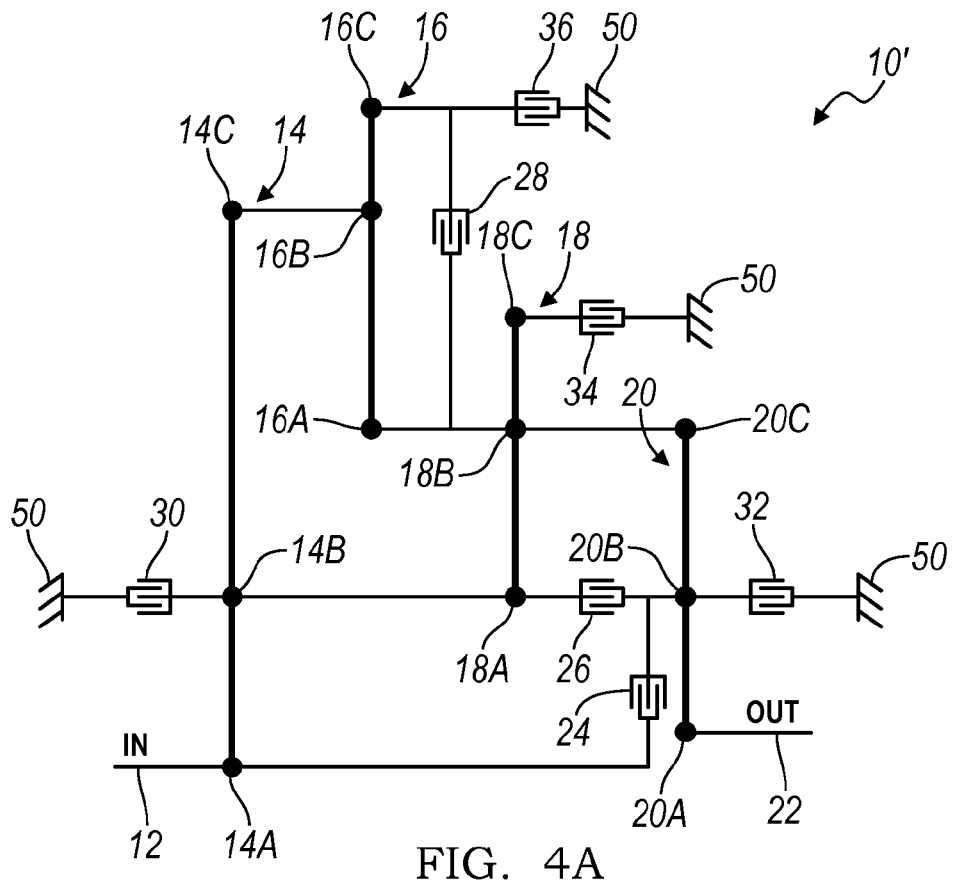
Figure 4B:
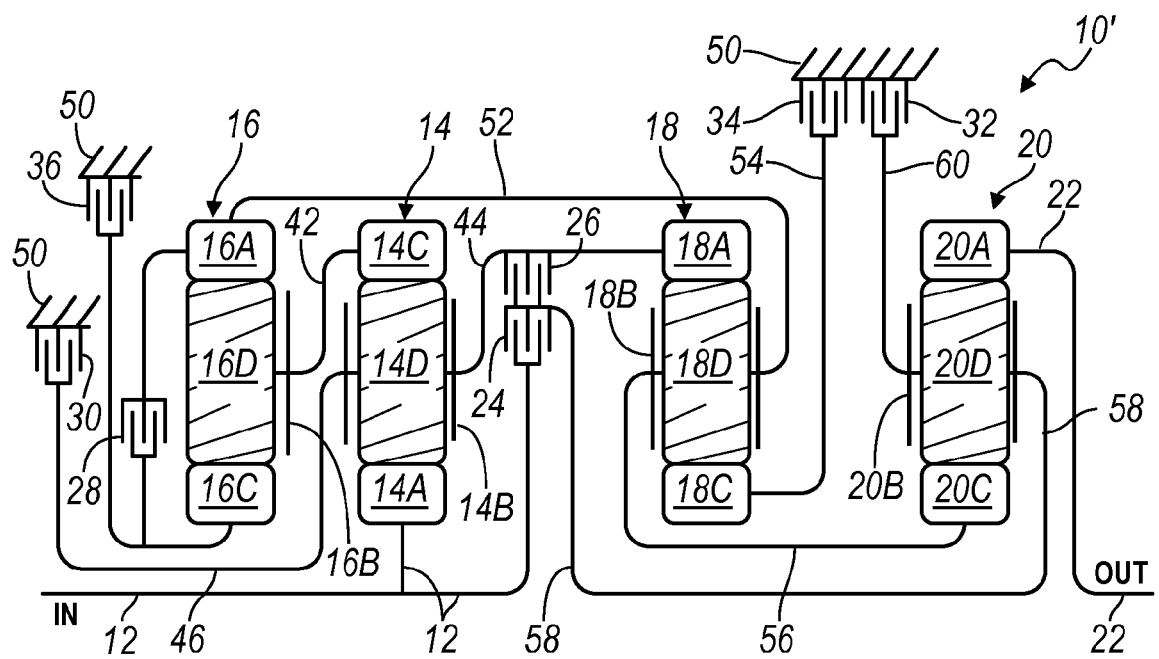
Figure 5A:
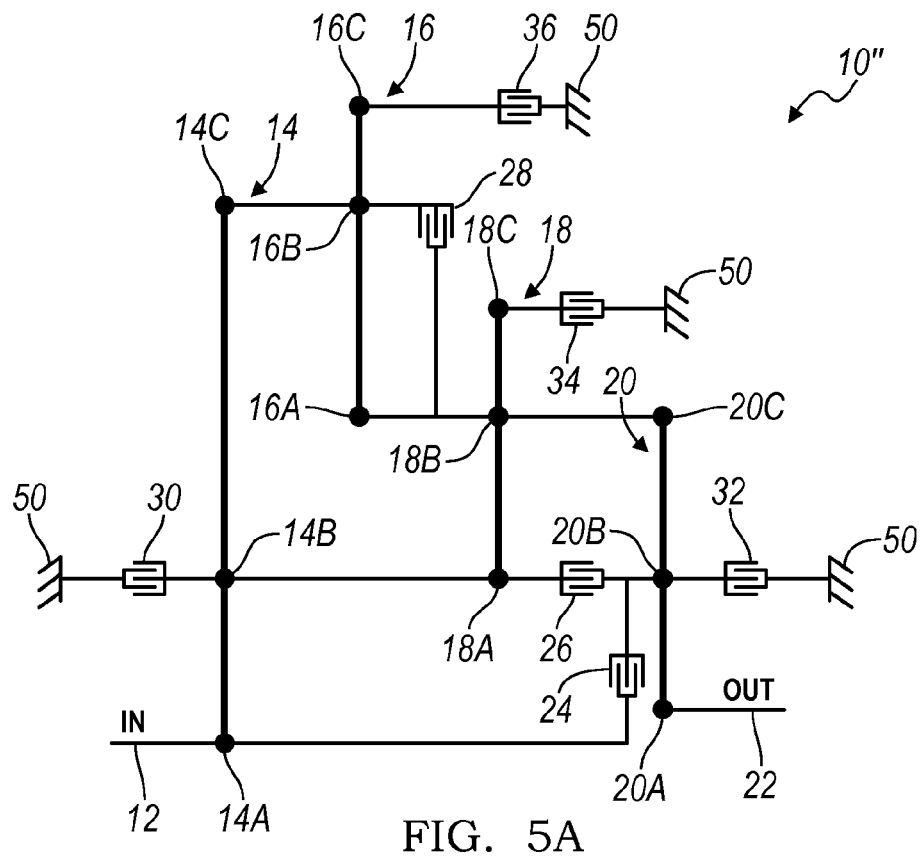
Figure 5B:
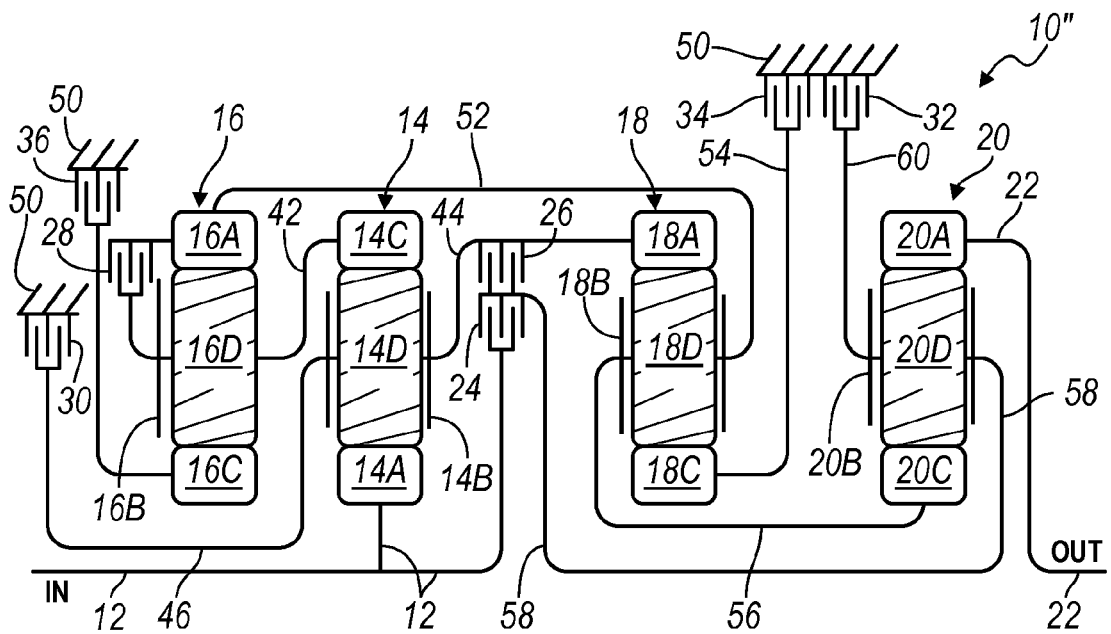
Figure 6A:
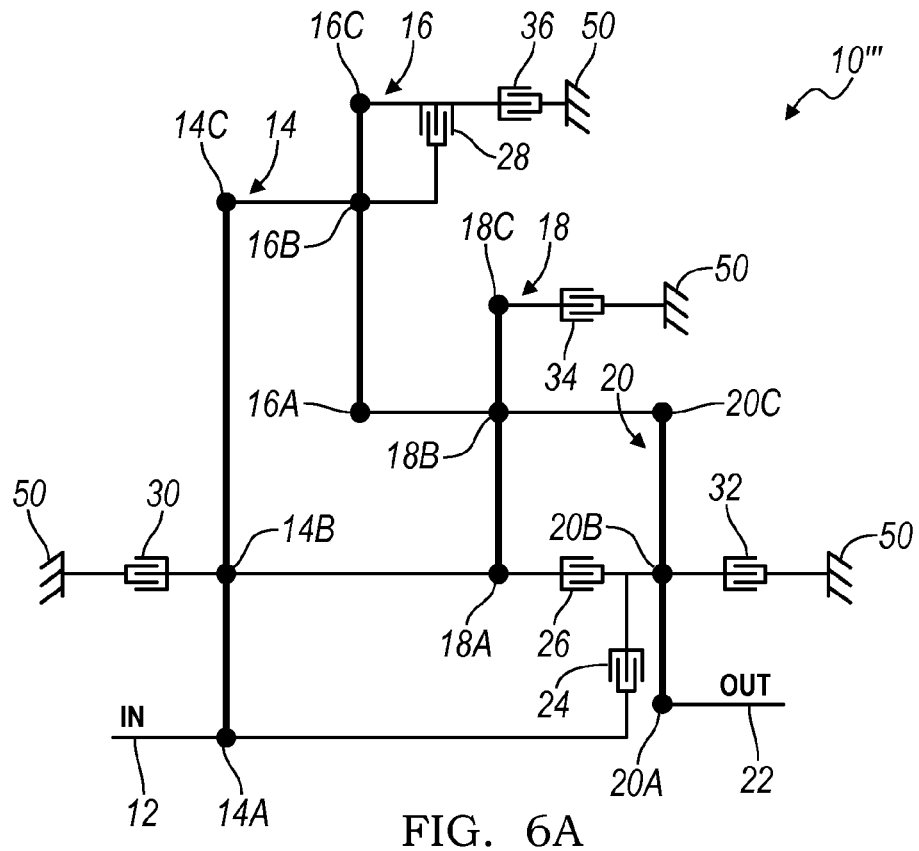
Figure 6B:
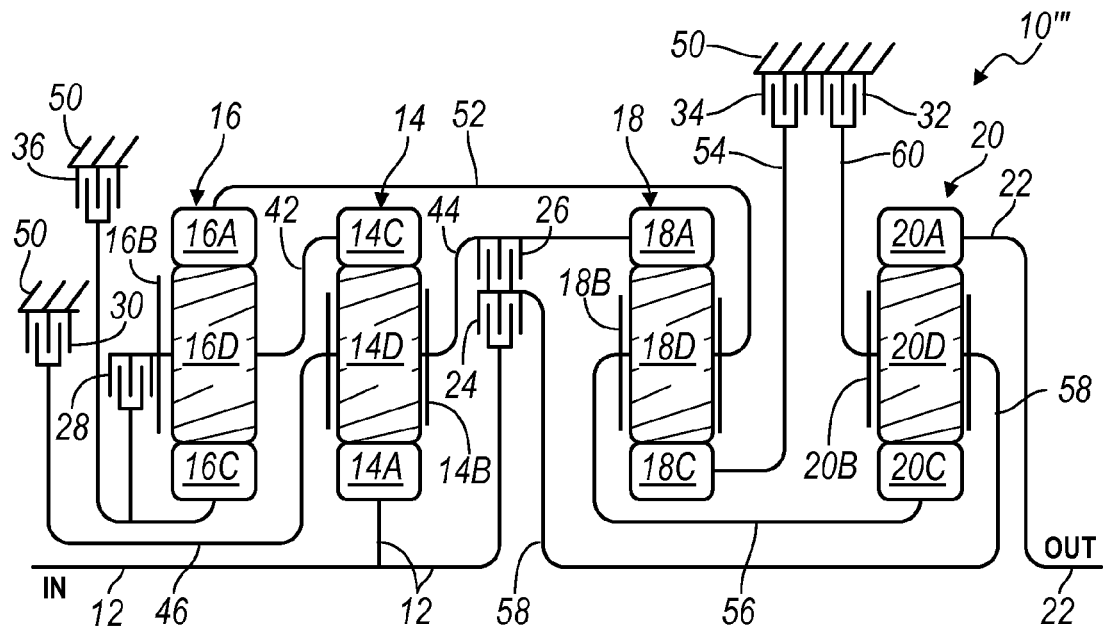

Additionally, the present invention contemplates other embodiments of transmission 10 having different interconnections for the third clutch 28 as illustrated in FIGS. 4A, 4B, 5A, 5B, 6A and 6B. For example, in FIG. 4A a transmission 10' has the third clutch 28 selectively interconnecting the third node 16C of the second planetary gear set 16 with the first node 16A of the second planetary gear set 16. In FIG. 4B, transmission 10' has the third clutch 28 selectively interconnecting the sun gear 16C of the second planetary gear set 16 with the ring gear 16A of the second planetary gear set 16. In FIG. 5A, a transmission 10" has the third clutch 28 selectively interconnecting the third node 16C of the second planetary gear set 16 with the second node 16B of the second planetary gear set 16. In FIG. 5B, the transmission 10" has the third clutch 28 selectively interconnecting the carrier member 16B of the second planetary gear set 16 with the ring gear 16A of the second planetary gear set 16. In FIG. 6A, transmission 10''' has the third clutch 28 selectively interconnecting the third node 16C of the second planetary gear set 16 with the second node 16B of the second planetary gear set 16. In FIG. 6B, transmission 10''' has the third clutch 28 selectively interconnecting the sun gear 16C of the second planetary gear set 16 with the carrier member 16B of the second planetary gear set 16.

In yet another embodiment of the present invention, transmissions 10, 10', 10" and 10''' may have input shafts or members 12 connected to a torque converter or directly to the engine. In the case where the input shaft 12 is directly connected to the engine and no torque converter is provided the third clutch 28 is used as a vehicle launch clutch. For example, when starting the vehicle from rest, and then shifted into first gear, second clutch 26 and second brake 32 are engaged and third clutch 28 is allowed to slip (by not being fully engaged). To launch the vehicle, the third clutch 28 is then fully engaged. When the vehicle is at rest, and then shifted into reverse, the second and third brakes 32 and 34 are engaged and the third clutch 28 is allowed to slip until the third clutch is fully engaged and the vehicle is launched in reverse.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members, and wherein the input member is continuously connected for common rotation with the first member of the first planetary gear set;
a first interconnecting member continuously interconnecting the second member of the first planetary gear set with the first member of the third planetary gear set;
a second interconnecting member continuously interconnecting the third member of the first planetary gear set with the second member of the second planetary gear set;
a third interconnecting member continuously interconnecting the first member of the second planetary gear set with the second member of the third planetary gear set and the third member of the fourth planetary gear set; and
seven torque transmitting mechanisms each selectively engageable to interconnect at least one of the first, second, and third members of one of the first, second, third and fourth planetary gear sets with at least one other of the first, second, third members of one of the first, second, third and fourth planetary gear sets and a stationary member, and
wherein the seven torque transmitting mechanisms are selectively engageable in combinations of at least three to establish a plurality of forward speed ratios and at least one reverse speed ratio between the input member and the output member.

2. The transmission of claim 1 wherein a first of the seven torque transmitting mechanisms is selectively engageable to interconnect the first member of the first planetary gear set and the input member with the second member of the fourth planetary gear set.

3. The transmission of claim 2 wherein a second of the seven torque transmitting mechanisms is selectively engageable to interconnect the second member of the first planetary gear set and the first member of the third planetary gear set with the second member of the fourth planetary gear set.

4. The transmission of claim 3 wherein a third of the seven torque transmitting mechanisms is selectively engageable to interconnect the third member of the first planetary gear set and the second member of the second planetary gear set with the third member of the second planetary gear set.

5. The transmission of claim 4 wherein a fourth of the seven torque transmitting mechanisms is selectively engageable to interconnect the second member of the fourth planetary gear set with the stationary member.

6. The transmission of claim 5 wherein a fifth of the seven torque transmitting mechanisms is selectively engageable to interconnect the second member of the first planetary gear set and the first member of the third planetary gear set with the stationary member.

7. The transmission of claim 6 wherein a sixth of the seven torque transmitting mechanisms is selectively engageable to interconnect the third member of the third planetary gear set with the stationary member.

8. The transmission of claim 7 wherein a seventh of the seven torque transmitting mechanisms is selectively engageable to interconnect the third member of the second planetary gear set with the stationary member.

9. The transmission of claim 1 wherein the output member is continuously connected for common rotation with the first member of the fourth planetary gear set.

10. The transmission of claim 3 wherein a third of the seven torque transmitting mechanisms is selectively engageable to interconnect the third member of the second planetary gear set with the first member of the second planetary gear set, the second member of the third planetary gear set and the third member of the fourth planetary gear set.

11. The transmission of claim 10 wherein a fourth of the seven torque transmitting mechanisms is selectively engageable to interconnect the second member of the fourth planetary gear set with the stationary member.

12. The transmission of claim 11 wherein a fifth of the seven torque transmitting mechanisms is selectively engageable to interconnect the second member of the first planetary gear set and the first member of the third planetary gear set with the stationary member.

13. The transmission of claim 12 wherein a sixth of the seven torque transmitting mechanisms is selectively engageable to interconnect the third member of the third planetary gear set with the stationary member.

14. The transmission of claim 13 wherein a seventh of the seven torque transmitting mechanisms is selectively engageable to interconnect the third member of the second planetary gear set with the stationary member.

15. The transmission of claim 3 wherein a third of the seven torque transmitting mechanisms is selectively engageable to interconnect the third member of the first planetary gear set and the second member of the second planetary gear set with the first member of the second planetary gear set, the second member of the third planetary gear set and the third member of the fourth planetary gear set.

16. The transmission of claim 15 wherein a fourth of the seven torque transmitting mechanisms is selectively engageable to interconnect the second member of the fourth planetary gear set with the stationary member.

17. The transmission of claim 16 wherein a fifth of the seven torque transmitting mechanisms is selectively engageable to interconnect the second member of the first planetary gear set and the first member of the third planetary gear set with the stationary member.

18. The transmission of claim 17 wherein a sixth of the seven torque transmitting mechanisms is selectively engageable to interconnect the third member of the third planetary gear set with the stationary member.

* * * * *